United States Patent
Coates

(10) Patent No.: US 6,997,136 B1
(45) Date of Patent: Feb. 14, 2006

(54) TEAT CUP ASSEMBLY

(75) Inventor: Alan B. Coates, Sun Prairie, WI (US)

(73) Assignee: Avon Hi-Life, Inc., Johnson Creek, WI (US)

( * ) Notice: Subject to any disclaimer, the term of this patent is extended or adjusted under 35 U.S.C. 154(b) by 0 days.

(21) Appl. No.: 10/708,629

(22) Filed: Mar. 16, 2004

Related U.S. Application Data

(60) Provisional application No. 60/320,035, filed on Mar. 21, 2003.

(51) Int. Cl.
*A01J 5/04* (2006.01)

(52) U.S. Cl. ................................. 119/14.47; 119/14.48

(58) Field of Classification Search ............. 119/14.47, 119/14.48, 14.49, 14.22, 14.23, 14.24, 14.27; D30/199
See application file for complete search history.

(56) References Cited

U.S. PATENT DOCUMENTS

| | | | |
|---|---|---|---|
| 2,502,362 A | | 3/1950 | Babson et al. |
| 2,997,980 A | * | 8/1961 | Noorlander ............... 119/14.52 |
| 3,659,558 A | * | 5/1972 | Noorlander ............... 119/14.52 |
| 4,332,215 A | * | 6/1982 | Larson ..................... 119/14.49 |
| 5,069,162 A | * | 12/1991 | Thompson et al. ....... 119/14.47 |
| 6,435,132 B1 | | 8/2002 | Milbrath et al. |
| 6,631,694 B1 | | 10/2003 | Chowdhury |
| 6,745,718 B1 | * | 6/2004 | Chowdhury ............. 119/14.47 |
| 6,755,153 B1 | * | 6/2004 | Chowdhury ............. 119/14.47 |

* cited by examiner

*Primary Examiner*—Yvonne R. Abbott
(74) *Attorney, Agent, or Firm*—McGarry Bair PC

(57) ABSTRACT

A teat cup assembly comprises an inflation having a plurality of radially-extending longitudinal ribs circumferentially spaced about the inflation and having a T-shaped cross-section. An outer shell for receiving the inflation comprises a plurality of longitudinally-extending slots having a T-shaped cross-section adapted for slidable communication with the ribs

19 Claims, 3 Drawing Sheets

US 6,997,136 B1

TEAT CUP ASSEMBLY

CROSS-REFERENCE TO RELATED APPLICATION

This application claims the benefit of U.S. Provisional Patent Application Ser. No. 60/320,035, filed Mar. 21, 2003, which is incorporated herein in its entirety.

FIELD OF THE INVENTION

This invention relates to teat cup assemblies for automatic milking machines. In one of its aspects, the invention relates to a teat cup assembly with a tubular inflation which is retained in a predetermined relationship to a teat cup outer shell during the operation of an automatic milking machine.

DESCRIPTION OF THE RELATED ART

Teat cup assemblies are used in automatic milking machines for milking cows and other animals. The teat is inserted into the teat cup assembly, which massages the teat to aid in extraction of milk therefrom and directs the extracted milk to a collection apparatus. U.S. Pat. No. 2,502,362 to Babson et al., issued Mar. 28, 1950, describes a teat cup assembly comprising a rigid tubular outer shell surrounding a flexible tubular inflation wherein the inflation and the interior surface of the shell have a triangular cross-section. U.S. Pat. No. 6,435,132 to Milbrath et al., issued Aug. 20, 2002, describes a similar teat cup assembly wherein the inflation has one or more longitudinal beads that appear to be tightly retained in mating channels in the shell. The inflations are slightly bowed between the longitudinal beads and require radial movement of the beads with respect to the channels during the inflation cycle in order to collapse inwardly. However, those inflations that are disclosed in the '132 patent do not appear to be able to articulate in a radial direction, either outwardly or inwardly. This process will take an unacceptable amount of time and will also bring undue stress and fatigue on the wall of the rubber inflation. If the ribs are held tightly in the grooves as it appears from the drawings, then the walls of the inflation are unlikely to be able to collapse completely and touch during inflation cycle. If held at the grooves, the inner wall surfaces would have to stretch which would increase the response time and stress the inflation. On the other hand, if the ribs are not securely held by the grooves, the ribs might become dislodged from the grooves during the inflation cycles. Further, the tightness of the ribs in the grooves would make it difficult to feed the ribs along the grooves during assembly of the inflations in the shell. It would therefore appear that the teat cup assemblies illustrated in all Figures, except perhaps the single rib and groove combination of FIG. 5, would not be satisfactory in a typical milking machine.

SUMMARY OF THE INVENTION

According to the invention, a teat cup assembly has a shell and a flexible inflation mounted therein wherein the shell has a plurality of interior longitudinal channels, each with at least one retaining flange that defines an edge of a slot in the channel that faces the interior of the shell, and the inflation has an external rib in each of the channels and that is retained for radial articulation within the channels during inflation and deflation of the inflation. The interior longitudinal channels and the external ribs are shaped to provide radial articulation of the external ribs during inflation and deflation of the inflations.

In one embodiment, the external ribs of the inflation have a neck that is received in the slot of the shell channel and at least one laterally extending flange that seats radially outwardly of the shell retaining flange. Preferably the ribs extend longitudinally within the channel. Further, the ribs can be generally complementary in shape to the longitudinal channels while still providing for radial articulation of the ribs within the channels.

In a preferred embodiment of the invention, each of the channels is T-shaped in cross-section. Further, the longitudinal ribs are also preferably T-shaped. The T-shaped ribs preferably fit loosely within the T-shaped channels for radial articulation of the T-shaped ribs with respect to the T-shaped channels during an inflation and deflation cycle.

The invention also contemplates that the interior longitudinal channels and the ribs can take various forms so long as the ribs are retained within the channels during inflation and deflation of the inflation and so long as the ribs can articulate within the interior longitudinal channels during the inflation and deflation cycle. Thus, the interior longitudinal channels and the ribs can be L-shaped in longitudinal cross section so that there is only one retaining flange of the channel and only one laterally extending flange on the rib.

In a preferred embodiment of the invention, there are three interior T-shaped longitudinal channels although the invention contemplates 2, 4 or more interior T-shaped longitudinal channels.

DESCRIPTION OF THE PREFERRED EMBODIMENT

Figure 1:
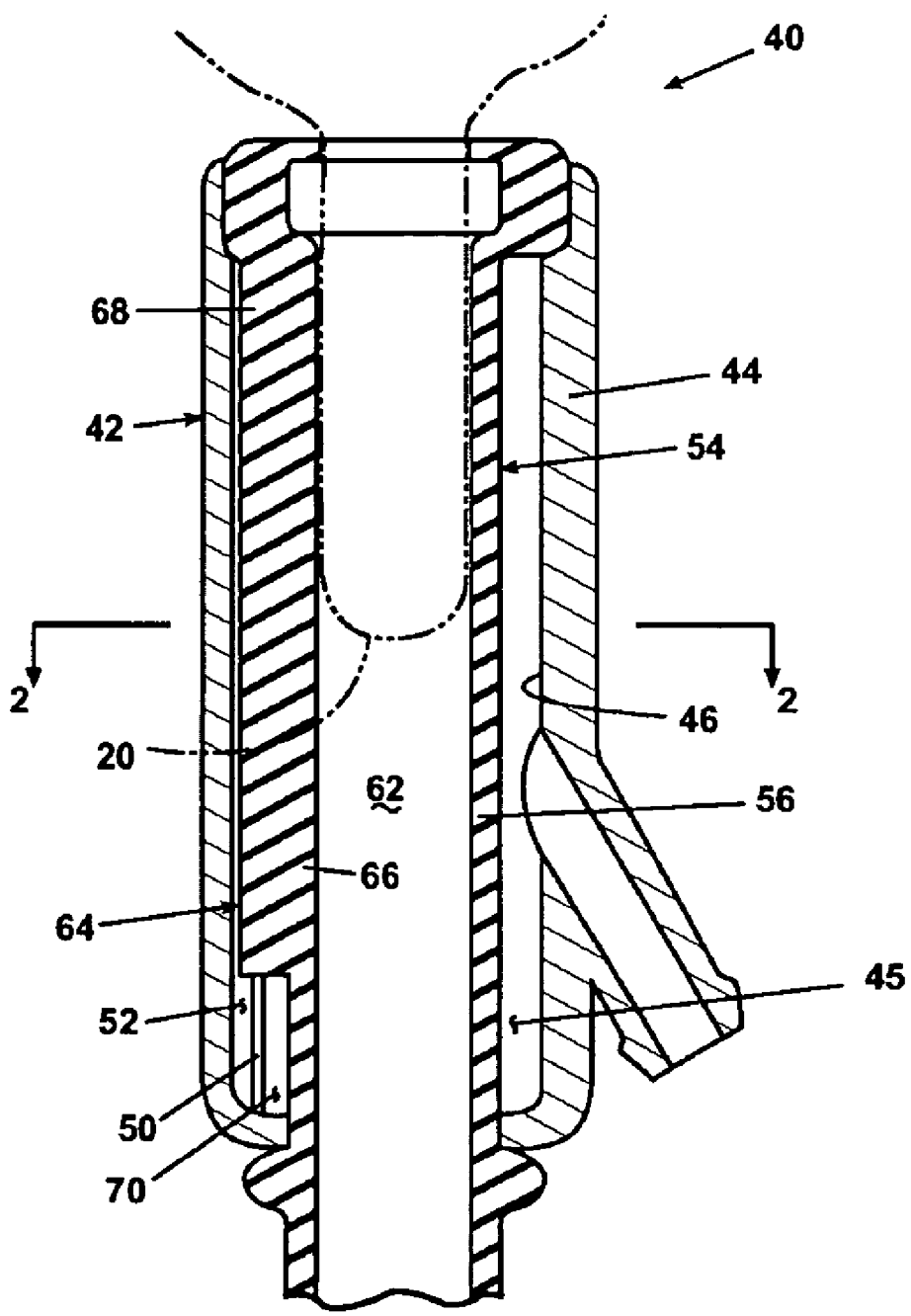
FIG. 1 is a longitudinal sectional view of a teat cup assembly comprising a shell and an inflation according to the invention.
Figure 2:
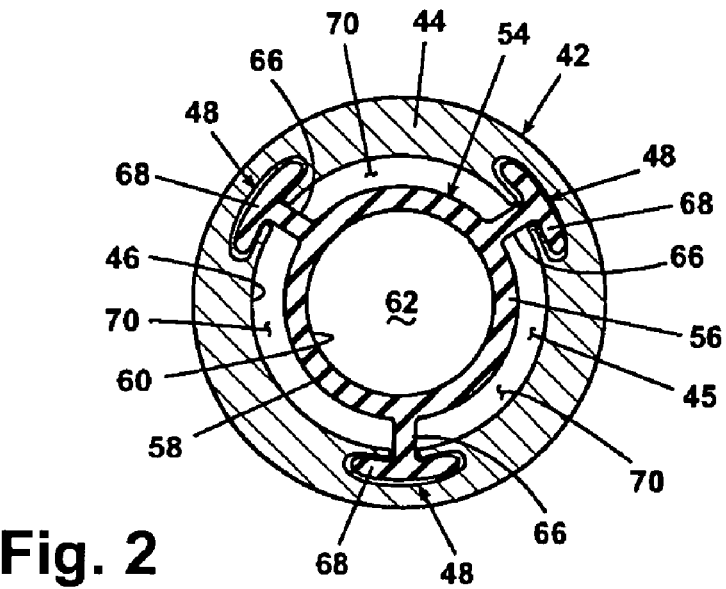
FIG. 2 is a sectional view of the teat cup assembly of FIG. 1 taken along line 2—2 thereof showing the inflation in an uncollapsed state.
Figure 3:
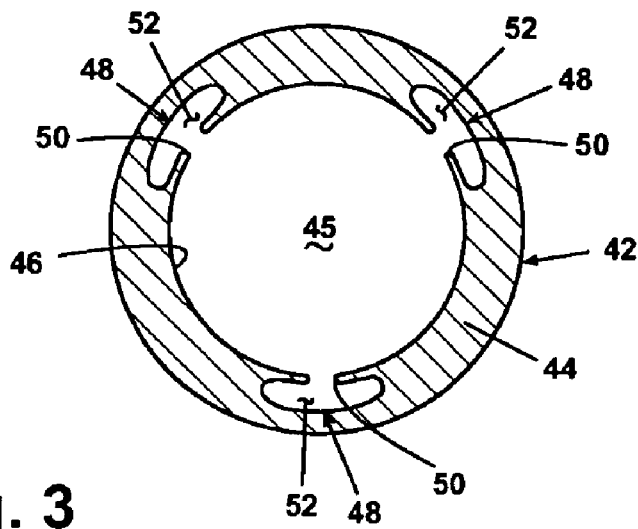
FIG. 3 is a sectional view of the shell shown in FIGS. 1 and 2.
Figure 4:
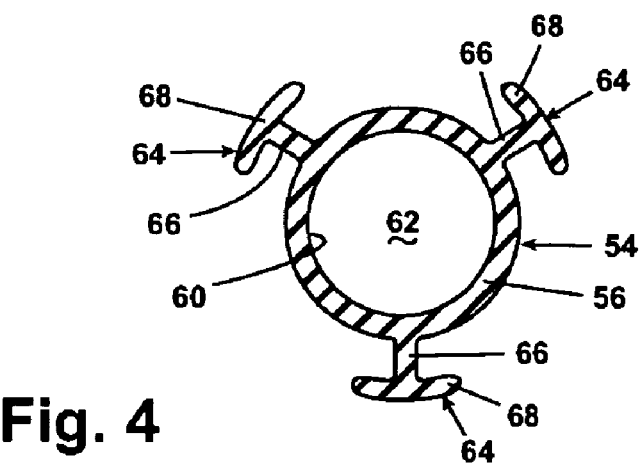
FIG. 4 is a sectional view of the inflation shown in FIGS. 1 and 2.

Referring now to the drawings, a teat cup assembly 40 comprises an outer shell 42 and an inflation 54. The outer shell 42 is a hollow, elongated body comprising an annular wall 44 having a curved inner surface 46 to define a bore 45. Extending radially from the surface 46 into the annular wall 44 is a plurality of longitudinal channels 48 in a preferred embodiment of three channels 48 spaced at 120° apart. Each channel 48 comprises a radial slot 50 opening into an arcuate chamber 52 to form a generally T-shaped channel.

The inflation 54 is a tubular member formed from a flexible elastomeric material such as natural or synthetic rubber. The inflation comprises an annular wall 56 having a curved outer surface 58 and a curved inner surface 60. The inner surface 60 defines a duct 62 for receiving a cow's teat 20 in a generally conventional manner. Extending radially outwardly from the outer surface 58 is a plurality of longitudinal ribs 64. In the preferred embodiment illustrated in the drawings, there are three ribs spaced at 120° apart. The ribs 64 comprise a neck 66 extending radially outwardly from the outer surface 58 and terminating generally orthogonally in an arcuate flange 68 for slidable communication with the channels 48. The ribs 64 are retained within the channels 48 by slidably inserting the flanges 68 into the arcuate chambers 52 with the necks 66 extending through the slots 50 to define three defined but communicable pressure chambers 70. As illustrated in the drawings, the ribs 64 fit loosely within the channels 48 so that they can articulate radially during the inflation and deflation cycle.

Figure 5:
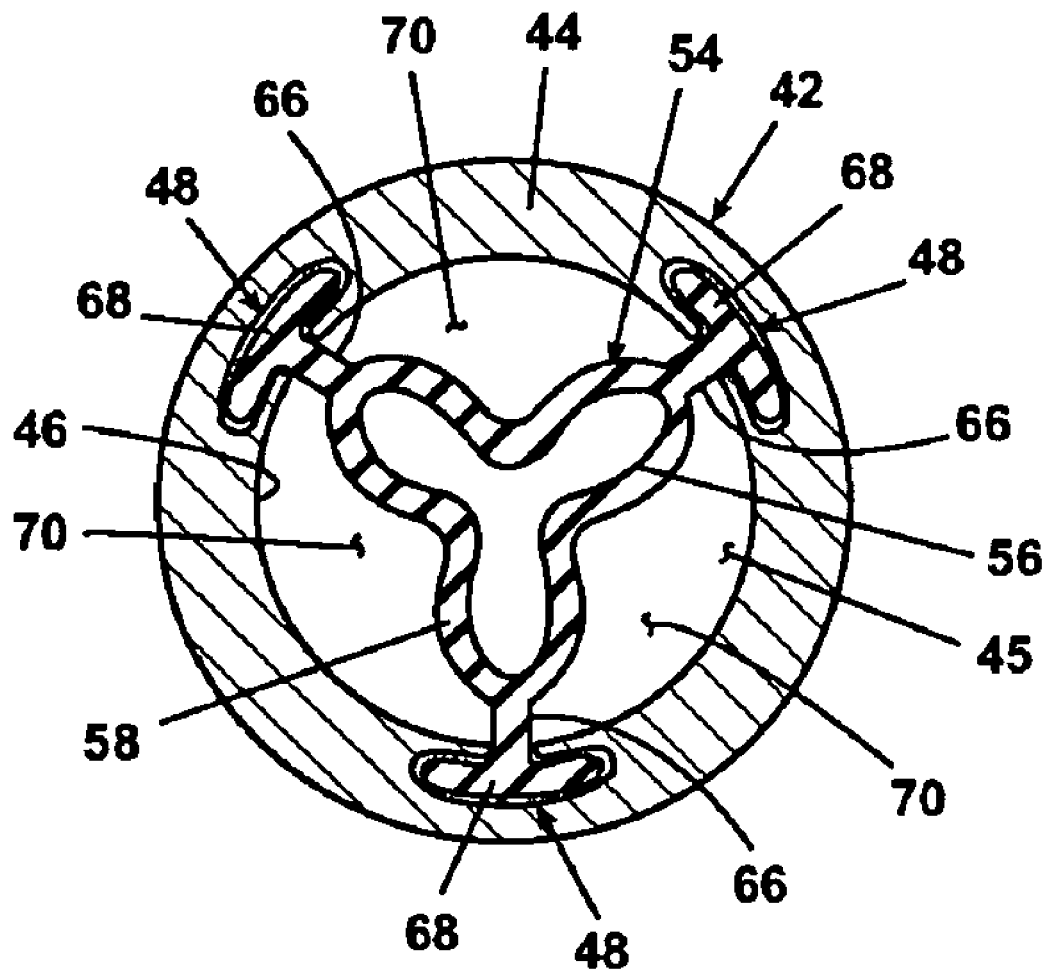
FIG. 5 is a sectional view similar to FIG. 2 of a teat cup assembly showing the inflation in a collapsed state.

The operation of the teat cup assembly 40 is as follows. A vacuum is applied to the duct 60 while the pressure chambers 70 are alternately evacuated by connection to a vacuum source and connected to atmosphere air in order to impart a massaging motion to the inflation 54 and the teat 20. When the pressure chambers 70 are connected to atmospheric pressure, the annular wall 56 collapses radially inwardly, as shown in FIG. 5, thereby pulling the ribs in a radial direction. Because of the loose tolerances of the ribs 64 in the channels 48, the ribs 64 freely articulate in a radial direction. The flange 68 on the ribs 64 retains the ribs within the channels 48.

The configuration of the ribs 64 and the channels 48 facilitates the installation of the inflation 54 in the outer shell 42 since the flanges 68 can be slidably inserted into the chambers 52 as the inflation 54 is inserted into the bore 45. The chambers 52 are somewhat larger than the flanges 68, facilitating insertion of the flanges 68. During the collapse of the inflation 54 with atmospheric pressure in the pressure chambers 70, as shown in FIG. 5, the necks 66 can stretch if necessary to accommodate the inward radial displacement of the inflation 54. Because the flanges 68 are securely retained in the chambers 52, the inflation 54 remains fully supported in the outer shell 42.

While the invention has been specifically described in connection with certain specific embodiments thereof, it is to be understood that this is by way of illustration and not of limitation. For example, the teat assembly can have fewer or more than three ribs and channels. The invention is equally applicable to teat cups having two or four rib and channel sets. Reasonable variation and modification are possible within the scope of the forgoing description and drawings without departing from the spirit of the invention, which is described in the appended claims.

What is claimed is:

1. A teat cup assembly comprising a shell and a flexible inflation mounted therein wherein the shell has a plurality of interior longitudinal channels, each with at least one retaining flange that defines an edge of a slot in the channel that faces the interior of the shell, and the inflation has an external rib in each of the channels and that is retained for radial articulation within the channels during inflation and deflation of the inflation, and wherein the interior longitudinal channels and the external ribs are shaped to provide radial articulation of the external ribs during inflation and deflation of the inflations.

2. A teat cup assembly according to claim 1 wherein the external ribs of the inflation have a neck that is received in the slot of the shell channel and at least one laterally extending flange that seats radially behind the shell retaining flange.

3. A teat cup assembly according to claim 2 wherein the ribs extend longitudinally within the channel.

4. A teat cup assembly according to claim 3 wherein the ribs are generally complementary in shape to the longitudinal channels while still providing for radial articulation of the ribs within the channels.

5. A teat cup assembly according to claim 4 wherein each of the channels is T-shaped in transverse cross-section.

6. A teat cup assembly according to claim 5 wherein the longitudinal ribs are also T-shaped in transverse cross section.

7. A teat cup assembly according to claim 6 wherein the T-shaped ribs fit loosely within the T-shaped channels for radial articulation of the T-shaped ribs with respect to the T-shaped channels during an inflation and deflation cycle.

8. A teat cup assembly according to claim 7 wherein there are three interior T-shaped longitudinal channels.

9. A teat cup assembly according to claim 1 wherein the ribs extend longitudinally within the channel.

10. A teat cup assembly according to claim 1 wherein each of the channels is T-shaped in transverse cross-section.

11. A teat cup assembly according to claim 10 wherein the longitudinal ribs are T-shaped in transverse cross section.

12. A teat cup assembly according to claim 11 wherein the T-shaped ribs fit loosely within the T-shaped channels for radial articulation of the T-shaped ribs with respect to the T-shaped channels during an inflation and deflation cycle.

13. A teat cup assembly according to claim 12 wherein there are three interior T-shaped longitudinal channels.

14. A teat cup assembly according to claim 1 wherein the longitudinal ribs are T-shaped in transverse cross section.

15. A teat cup assembly according to claim 1 wherein there are three interior T-shaped longitudinal channels.

16. A teat cup assembly comprising a shell and a flexible inflation mounted therein wherein the shell has a plurality of interior longitudinal channels, and the inflation has an external rib in each of the channels and that is loosely retained in each channel for radial articulation of the ribs with respect to the channels during inflation and deflation of the inflation.

17. A teat cup assembly according to claim 16 wherein the ribs extend longitudinally within the channel.

18. A teat cup assembly according to claim 17 wherein each of the channels is T-shaped in transverse cross-section and the longitudinal ribs are T-shaped in transverse cross section.

19. A teat cup assembly according to claim 17 wherein each of the channels is L-shaped in transverse cross-section and the longitudinal ribs are L-shaped in transverse cross section.

* * * * *